3,154,532
NEW WATER-SOLUBLE AZO DYES CONTAINING A QUINAZOLINE RADICAL
Hans Weidinger, Guenter Lange, and Gerhard Wellenreuther, Ludwigshafen (Rhine), Germany, assignors to Badische Anilin- & Soda-Fabrik Aktiengesellschaft, Ludwigshafen (Rhine), Germany
No Drawing. Filed June 12, 1962, Ser. No. 201,758
Claims priority, application Germany June 16, 1961
6 Claims. (Cl. 260—154)

This invention relates to new water-soluble azo dyes containing the radical of an arylhaloquinazoline, a process for the production of these dyes, and the use of these dyes for the dyeing of textile materials composed of natural or regenerated cellulose.

Water-soluble azo dyes which contain reactive chlorine atoms and are suitable for the dyeing of natural or regenerated cellulose under alkaline conditions are already known. Such reactive dyes, as they are called, which contain a single reactive halogen atom in a heterocyclic component, react rapidly wtih the cellulosic fiber only at elevated temperature. When dyeing is performed at low temperature, a very long dyeing time is required. It is better for the dyer, however, to use reactive dyes which react rapidly even at low temperatures, because the substantivity of the dyes decreases with rising temperature, resulting in poorer exhaustion of the bath.

We have now found that, surprisingly, the dyes of this invention, which contain only 1 halogen atom bound in a heterocyclic radical, go onto and react with the cellulosic fiber readily and rapidly even at low temperature. In addition, the dyes in accordance with this invention are distinguished from prior art dyes by outstanding coloring strength and good substantivity.

The water-soluble azo dyes in accordance with this invention have the formula

A—N=N—B in which A stands for a radical derived from an unsubstituted or substituted 2-aryl-3-haloquinazoline of the formula

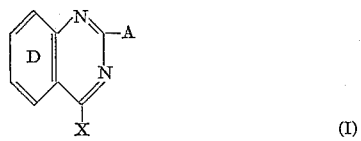

(I)

in which A stands for an unsubstituted or substituted aromatic radical, X stands for a halogen atom, the carbocyclic ring D may be substituted, and B represents the radical of a water-soluble coupling component.

Examples of aromatic radicals A which may be substituted are radicals containing up to 2 benzene rings, such as the radicals of benzene, of naphthalene or of diphenyl. These aromatic radicals, like the carbocyclic ring D, may contain the substituents common in the chemistry of azo dyes, such as halogen atoms, low molecular weight alkyl groups, low molecular weight alkoxyl groups, aryl groups, aralkyl groups, ionic water-solubilizing groups, such as sulfonic acid groups or carboxyl groups, or non-ionic water-solubilizing groups, such as methylsulfonyl groups. Halogen atoms are fluorine, bromine, iodine and preferably chlorine atoms.

Radicals which are derived from Formula I are in particular the radicals of 2-phenyl-4-chloroquinazoline, of which the preferred ones are those that are linked with the azo bond in the 3- or 4-position of the phenyl radical or in the 6-position of the quinazoline radical. The azo dyes in accordance with this invention may be mono-, di- or polyazo dyes, the preferred ones being the monoazo dyes.

Suitable coupling compounds are the coupling components common in the chemistry of azo dyes, preferably coupling components of the naphthalene series, and coupling components of the pyrazole series containing at least one ionic water-solubilizing group, preferably one or several sulfonic groups. Examples of such coupling components are: hydroxynaphthalenesulfonic acids, such as 1-hydroxy-naphthalene-3-sulfonic acid, 1-hydroxy-naphthalene-4-sulfonic acid, 2-hydroxynaphthalene-6-sulfonic acid, 2-hydroxynaphthalene-8-sulfonic acid, 1-hydroxynaphthalene-3,8- or -4,8-disulfonic acid, 2-hydroxynaphthalene-3,6-disulfonic acid, 1,8-dihydroxynaphthalene-3,6-disulfonic acid; aminohydroxynaphthalenesulforic acids, such as 2-amino-8-hydroxynaphthalene-6-sulfonic acid, 2-amino - 5 - hydroxynaphthalene-7-sulfonic acid, 1-hydroxy-6-aminonaphthalene-3-sulfonic acid, 1-hydroxy-7-aminonaphthalene-3-sulfonic acid, 1-amino-8-hydroxynaphthalene-3,6-disulfonic acid, and N-acyl derivatives thereof such as 1-acetylamino-8-hydroxy-naphthalene-3,6-disulfonic acid, 1-benzoylamino-8-hydroxynaphthalene-3,6-disulfonic acid, 1-hydroxy-8-acetylamino-3,5-disulfonic acid, or the coupling component of the formula

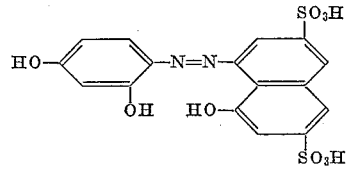

1-phenyl-3-methylpyrazolone-5-sulfonic acids, such as 1-(2-methyl-4-sulfophenyl)-3-methylpyrazolone-(5), 1-(2-chloro-5-sulfophenyl)-3-methylpyrazolone-(5) or 1-(3- or 4-sulfophenyl) - 3 - methylpyrazolone-(5), 1-(2,5-dichloro-4-sulfophenyl)-3-methylpyrazolone-(5); 1-phenyl-3-carboxypyrazolone-(5) and the 1-(sulfophenyl)-3-alkylpyrazolone-(4) described in British Patent 858,562.

The new dyes in accordance with the invention are produced by uniting diazotized 2-aryl-4-haloquinazolines which may be substituted and which contain one or more diazotizable primary amino groups at the aryl radical and/or at the carbocyclic part of the quinazoline system, with coupling compounds in the usual manner to azo dyes, the components being so selected that the resulting dye contains one or more water-solubilizing groups.

Of particular technical interest are monoazo dyes of the general formulae

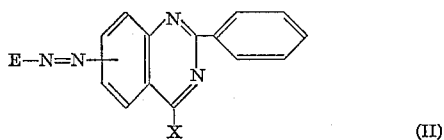

(II)

and preferably

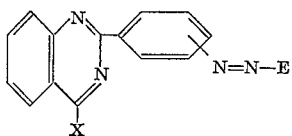

for example the formulae

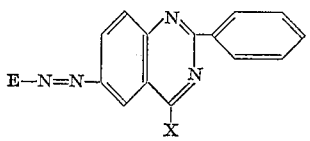

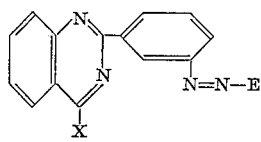

and preferably

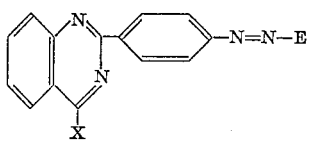

(IIIb)

where X stands for a halogen atom and E for the radical of a coupling component containing one or several water-solubilizing groups.

The new diazotizable aromatic amines of the 2-aryl-4-haloquinazoline series used in accordance with the invention can be obtained in various ways, e.g., by reacting an unsubstituted or substituted 2-aminobenzene carboxylic acid amide with a nitroarylcarboxylic acid chloride to the corresponding carboxylic acid amide, closing the quinazoline ring in the usual manner by splitting off water, then replacing the hydroxyl group at the heterocyclic ring of the quinazoline system by a halogen atom, and finally reducing the nitro group to the amino group, preferably by catalytic reduction:

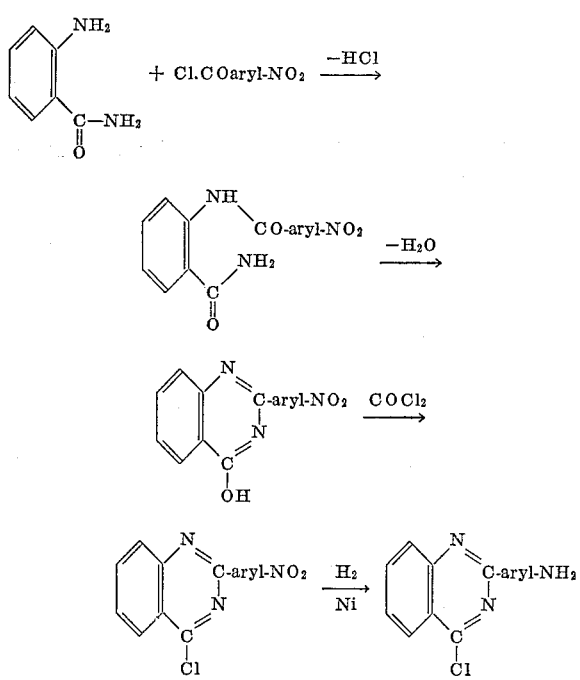

An alternative method, carried out in a similar manner, is to start with a 2-aminobenzenecarboxylic acid amide in which a nitro group is contained and an unsubstituted or substituted arylcarboxylic acid chloride.

(III)

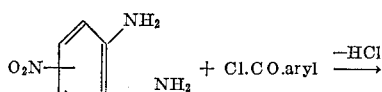

(IIa)

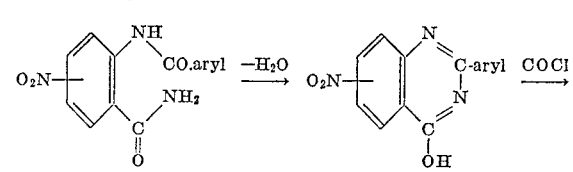

(IIIa)

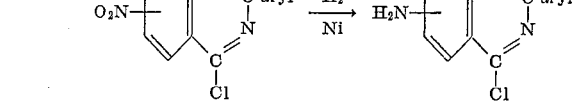

The new dyes produce brilliant, clear shades with excellent fastness properties when applied by the methods commonly employed for the dyeing and/or printing of textile materials, e.g., fibers, yarns, loose stock, and woven and knitted fabrics, composed of natural and/or regenerated cellulose with reactive dyes.

When used for the dyeing of cotton, rayon or linen by the exhaust process or by the pad-batch process, the new dyes have the advantage over the known reactive dyes that they produce intense, brilliant dyeings with good fastness to light and wet treatment, even with addition of small quantities of electrolytes.

The dyes obtained in accordance with the invention can also be used for the dyeing and/or printing of various other types of material, e.g., sheets of regenerated cellulose, films of polyvinyl alcohol, or textile materials of natural or synthetic linear polyamides, such as silk, wool, polycaprolactam, polylauric lactam, polyamino-undecanoic acid, or based on adipic acid and hexamethylene diamine, and they are also useful for the dyeing of fibrous materials, such as leather and paper.

Unless otherwise indicated, the parts and percentages specified in the examples are by weight. The ratio between parts by volume and parts by weight is the same as the ratio between a liter measured under standard conditions and a kilogram.

*Example 1*

A solution of 19.6 parts of sodium nitrite in 140 parts of water is stirred in small portions within 15 minutes at 0 to +5° C. into a suspension of 70 parts of 2-(4-aminophenyl)-4-chloroquinazoline in 350 parts of water and 90 parts of concentrated acetic acid after the addition of 160 parts of concentrated aqueous hydrochloric acid. The mixture is stirred for 1 hour at 5° C. 350 parts of concentrated acetic acid is then added. After stirring for a further 15 minutes, the mixture is incorporated within 15 minutes into a solution of 80 parts of 1-(2-chloro-5-sulfophenyl)-3-methyl-pyrazolone-(5), 300 parts of sodium acetate and 70 parts of sodium hydroxide in 2800 parts of water. The temperature should not rise to higher than 10° C. Stirring is continued for a further 20 minutes at 5 to 10° C. At the same temperature 240 parts of concentrated aqueous hydrochloric acid is added. The reaction product is then filtered with suction, washed with water, and dried at reduced pressure at 30° C. The yield is approximately 150 parts. The new dye of the formula

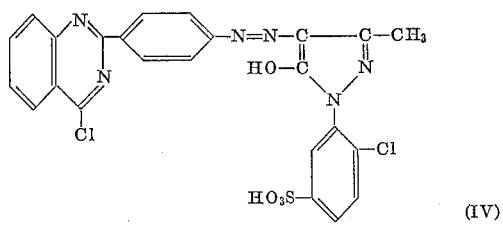

dyes cotton in brilliant reddish yellow shades. The dyeings have excellent coloristic properties.

The starting material mentioned in paragraph 1, 2-(4-aminophenyl)-4-chloroquinazoline, is obtained in the following manner:

100 parts of 2-aminobenzamide is dissolved in 500 parts by volume of glacial acetic acid and 500 parts by volume of saturated aqueous sodium acetate solution at room temperature (approximately 15 to 30° C.) with stirring. A solution of 135 parts of 4-nitrobenzoyl chloride in 90 parts by volume of acetone is then added to this solution in small portions. After stirring at room temperature for 1 hour, the reaction product is filtered by suction, washed with water, and dried.

74 parts of the 2-(p-nitrobenzoylamino)-benzamide thus obtained is added to a boiling mixture of 1000 parts by volume of 2 N aqueous sodium hydroxide solution and 50 parts by volume of pyridine. The solution is then filtered to remove impurities, cooled and weakly acidified with acetic acid. The precipitate which has settled is filtered with suction, washed acid-free with water, and dried.

In a suspension of 100 parts of the 2-(4-nitrophenyl)-4-hydroxy-1,3-quinazoline thus obtained in 300 parts of dichlorobenzene and 45 parts of dimethylformamide, phosgene is introduced at 100 to 110° C. with stirring, until starting material can no longer be detected. The reaction mixture is cooled to 10° C., and the crystal paste thus obtained is filtered with suction, washed with methanol, and dried. 90 to 95 parts of 2-(4-nitrophenyl)-4-chloroquinazoline with a melting point of 188 to 190° C. is obtained.

100 parts of 2-(4-nitrophenyl)-4-chloroquinazoline is pasted in 1500 parts by volume of acetone, and after addition of 10 parts of Raney nickel, hydrogenated at 20 to 30° C. As soon as the calculated amount of hydrogen has been absorbed, the catalyst is removed by suction and the acetone solution of the amine is poured into 5000 parts by volume of water. The amine precipitates. The reaction product is then filtered with suction, washed with water, and dried at 30° C. at reduced pressure. 88 parts of 2-(4-aminophenyl)-4-chloroquinazoline in the form of a yellow powder is obtained.

*Example 2*

A diazonium salt solution prepared as indicated in Example 1, paragraph 1, is run slowly, with good stirring, into a solution of 63 parts of 1-hydroxynaphthalene-4-sulfonic acid in 3400 parts of 3 N aqueous sodium hydroxide solution. The temperature is maintained at 5 to 10° C. The reaction mixture is stirred for 15 minutes. 240 parts of concentrated aqueous hydrochloric acid is then added at 5 to 10° C., the reaction product is filtered with suction, washed with water, and dried at reduced pressure at 30° C. The yield is 125 parts. The new dye of the formula

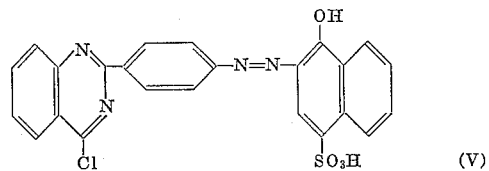

dyes cotton in brilliant scarlet red shades.

*Example 3*

A diazonium salt solution prepared as indicated in Example 1, paragraph 1, is stirred within 15 minutes into a solution of 74 parts of 1-(2-methyl-4-sulfophenyl)-3-methyl-pyrazolone-(5), 300 parts of sodium acetate, and 70 parts of sodium hydroxide in 2800 parts of water. The temperature should not rise to higher than 10° C. After stirring for 15 minutes, 240 parts of concentrated aqueous hydrochloric acid is added at 5 to 10° C., the reaction product is filtered with suction, washed, and dried at reduced pressure at 30° C. The yield is approximately 135 parts. The new dye of the formula

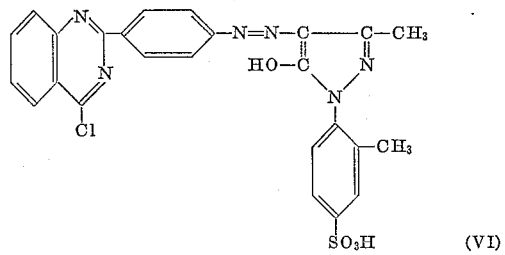

dyes brilliant reddish yellow shades with very good fastness properties on cotton.

Similar dyes are obtained in the same manner by using the following coupling components.

| | Shade of dyeing on cotton |
|---|---|
| 1 - (3 - sulfophenyl) - 3 - methylpyrazolone-(5) | Reddish yellow. |
| 1 - (4 - sulfophenyl) - 3 - methylpyrazolone-(5) | Do. |
| 1 - (2,5 - dichlor - 4 - sulfophenyl)-3-methyl-pyrazolone-(5) | Do. |

*Example 4*

A diazonium salt solution prepared as indicated in Example 1, paragraph 1, is stirred within approximately 30 minutes into a solution of 118 parts of 1-benzoylamino-8-hydroxynaphthalene-3,6-disulfonic acid in 5000 parts of 2 N aqueous sodium hydroxide solution. The temperature should not rise to higher than 10° C. In order to complete the reaction, the mixture is stirred for a further 15 minutes at 5 to 10° C., and 240 parts of concentrated aqueous hydrochloric acid is then added. The reaction product is filtered with suction, washed with water, and dried at reduced pressure at 30° C. The yield is 180 parts. The new dye of the formula

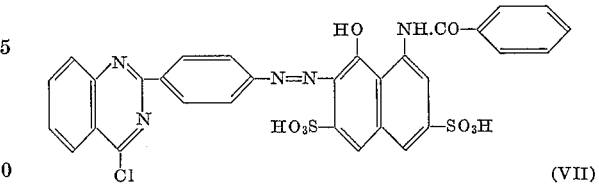

dyes cotton fabrics in brilliant red-violet shades. The dyes have very good fastness properties.

*Example 5*

The diazonium salt solution prepared according to Example 1, paragraph 1, is stirred within approximately 30 minutes into a solution of 88 parts of 1-amino-8-hydroxynaphthalene-3,6-disulfonic acid in 5000 parts of 2 N aqueous sodium hydroxide solution. The temperature should not rise to higher than 10° C. After stirring for 10 minutes at 5 to 10° C., 240 parts of concentrated aqueous hydrochloric acid is stirred into the mixture, the reaction product is filtered with suction, washed with water, and dried at reduced pressure at 30° C. The yield is approximately 140 parts. The new dye of the formula

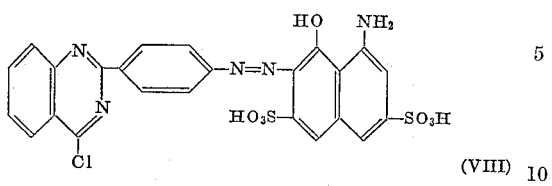

dyes spun rayon fabrics in violet shades.

*Example 6*

A diazonium salt solution prepared in accordance with Example 1, paragraph 1, is stirred slowly at 5 to 10° C. into a solution of 88 parts of 1,8-dihydroxynaphthalene-3,6-disulfonic acid in 5000 parts of 2 N aqueous sodium hydroxide solution. 240 parts of concentrated aqueous hydrochloric acid is then added to the mixture at 5 to 10° C. The reaction product is filtered with suction, washed with water, and dried at 30° C. in vacuo. The yield is approximately 100 parts. The new dye of the formula

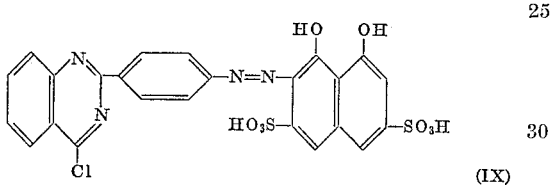

dyes textile materials of linen in red-violet shades.

*Example 7*

A diazonium salt solution prepared in accordance with Example 1, paragraph 1, is stirred into a solution of 84 parts of 2-hydroxynaphthalene-3,6-disulfonic acid in 4000 parts of 3 N aqueous sodium hydroxide solution at 5 to 10° C. When the conversion is completed, 240 parts of concentrated aqueous hydrochloric acid is added to the mixture at 5 to 10° C. The reaction product is then filtered with suction, washed with water, and dried at 30° C. in vacuo. The yield is approximately 120 parts. The new dye of the formula

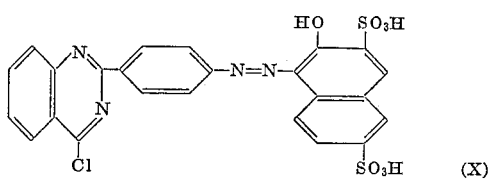

dyes cotton in clear red shades. The dyeings have good fastness properties.

Similar dyes are obtained in the same manner by using the following coupling components:

| Coupling component | Shade of dyeing on cotton |
|---|---|
| 1-hydroxynaphthalene-3-sulfonic acid | Red. |
| 2-hydroxynaphthalene-8-sulfonic acid | Red. |
| 2-hydroxynaphthalene-6-sulfonic acid | Red. |
| 1-hydroxy-6-aminonaphthalene-3-sulfonic acid | Red. |
| 1-hydroxy-6-acetylaminonaphthalene-3-sulfonic acid | Red-violet. |
| 1-hydroxy-7-aminonaphthalene-3-sulfonic acid | Red. |
| 1-hydroxynaphthalene-3,8-disulfonic acid | Red. |
| 1-hydroxynaphthalene-3,6-disulfonic acid | Red. |
| 1-hydroxynaphthalene-4,8-disulfonic acid | Red. |
| 1-hydroxy-8-acetylaminonaphthalene-3,5-disulfonic acid | Red-violet. |

*Example 8*

A solution of 7 parts of sodium nitrite in 30 parts of water is stirred slowly into a suspension of 25.6 parts of 2-(3-aminophenyl)-4-chloroquinazoline in a mixture of 150 parts of water, 60 parts of concentrated aqueous hydrochloric acid, and 50 parts of concentrated acetic acid at 0 to +5° C. When the diazotization is completed, 300 parts of concentrated acetic acid is added, and the mixture is stirred for 15 minutes and then poured into a solution of 27 parts of 1-(2-methyl-4-sulfophenyl)-3-methyl-5-pyrazolone, 100 parts of sodium acetate and 20 parts of sodium hydroxide in 1200 parts of water. The temperature should not rise to higher than 10° C. After stirring for 15 minutes 100 parts of concentrated aqueous hydrochloric acid is added. The reaction product is filtered with suction, washed with water, and dried at 30° C. at reduced pressure. The yield is 45 to 50 parts. The new dye of the formula

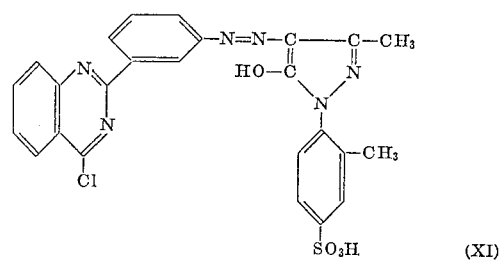

dyes cotton in greenish yellow shades with very good fastness properties.

The starting material 2-(3-aminophenyl)-4-chloroquinazoline mentioned in paragraph 1 can be obtained in the following manner:

2-(3-nitrophenyl)-4-hydroxyquinazoline is obtained by starting with 3-nitrobenzoyl chloride in place of 4-nitrobenzoyl chloride and proceeding otherwise as in Example 1, paragraphs 3 and 4.

Into a suspension of the 2-(3-nitrophenyl)-4-hydroxy-1,3-quinazoline thus obtained in 250 parts of nitrobenzene and 45 parts of dimethylformamide, phosgene is introduced at 90 to 100° C. with stirring, until the starting material can no longer be detected. The reaction product is then cooled to 10° C. and the precipitated crystal paste is filtered with suction, washed with methanol, and dried. The 2-(3-nitrophenyl)-4-chloroquinazoline obtained melts at 182 to 183° C. The yield is 92 parts.

100 parts of 2-(3-nitrophenyl)-4-chloroquinazoline is pasted in 1500 parts by volume of tetrahydrofuran, and after addition of 10 parts Raney nickel, hydrogenated at room temperature. As soon as the hydrogenation is completed, the catalyst is removed by filtering, and the filtrate is poured into 5000 parts by volume of water. The amino compound precipitates. It is filtered with suction, washed with water, and dried at 30° C. at reduced pressure. 85 parts of 2-(3-aminophenyl)-4-chloroquinazoline in the form of a pale yellow powder is obtained.

*Example 9*

A diazonium salt solution prepared as indicated in Example 8, paragraph 1, is stirred into a solution of 29 parts of 1-(2-chloro-5-sulfophenyl)-3-methylpyrazolone-(5), 100 parts of sodium acetate and 25 parts of sodium hydroxide in 1300 parts of water at 5 to 10° C. After 15 minutes 100 parts of concentrated aqueous hydrochloric acid is added to the mixture, the reaction product is filtered with suction, washed with water, and dried.

The yield is approximately 40 parts. The new dye of the formula

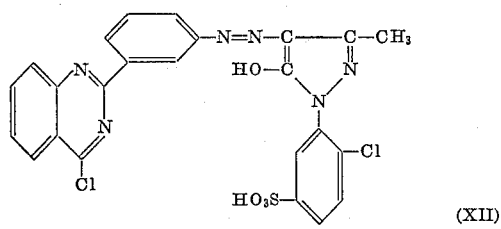

(XII)

dyes spun rayon fabrics in greenish yellow shades with very good fastness properties.

Similar dyes are obtained in the same manner by using the following coupling components:

| | Shade of dyeing on cotton |
|---|---|
| 1-(3-sulfophenyl) - 3 - methylpyrazolone-(5) | Reddish yellow. |
| 1-(4-sulfophenyl) - 3 - methylpyrazolone-(5) | Do. |
| 1-(2,5-dichloro-4-sulfophenyl)-3-methyl-pyrazolone-(5) | Do. |

Example 10

A diazonium salt solution prepared in accordance with Example 8, paragraph 1, is slowly stirred into a solution of 43 parts of 1-benzoylamino-8-hydroxynaphthalene-3,6-disulfonic acid in 3000 parts of 2 N aqueous sodium hydroxide solution at 5 to 10° C. After stirring for 15 minutes, 100 parts of concentrated aqueous hydrochloric acid is added to the mixture, and the reaction product is filtered with suction, washed with water, and dried. The yield is approximately 60 parts. The new dye of the formula

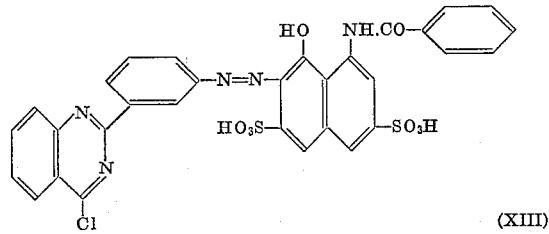

(XIII)

dyes textile materials of cotton in brilliant ruby-red shades.

Example 11

A diazonium salt solution prepared in accordance with Example 8, paragraph 1, is slowly stirred into a solution of 32 parts of 1-amino-8-hydroxynaphthalene-3,6-disulfonic acid in 3000 parts of 2 N aqueous sodium hydroxide solution at 5 to 10° C. When the conversion is completed, 100 parts of concentrated aqueous hydrochloric acid is stirred into the mixture, the reaction product is filtered with suction, washed with water, and dried. The yield is approximately 45 parts. The new dye of the formula

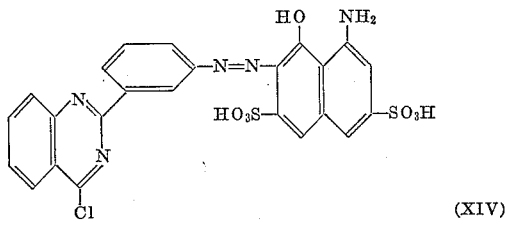

(XIV)

dyes cotton in violet shades.

Example 12

A diazonium salt solution prepared in accordance with Example 8, paragraph 1, is stirred into a solution of 23 parts of 1-hydroxynaphthalene-4-sulfonic acid in 3000 parts of 2 N aqueous sodium hydroxide solution at 5 to 10° C. When the conversion is completed, 100 parts of concentrated aqueous hydrochloric acid is stirred into the mixture, the reaction product is filtered with suction, washed with water, and dried. The yield is approximately 40 parts. The new dye of the formula

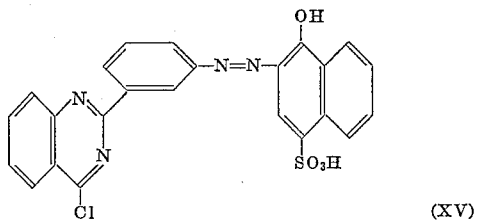

(XV)

dyes cotton fabrics in orange-red shades with good fastness properties.

Similar dyes are obtained in the same manner by using the following coupling components:

| | Shade of dyeing on cotton |
|---|---|
| 1-hydroxynaphthalene-3-sulfonic acid | Orange-red. |
| 2-hydroxynaphthalene-8-sulfonic acid | Do. |
| 2-hydroxynaphthalene-6-sulfonic acid | Do. |
| 1-hydroxy - 6 - aminonaphthalene-3-sulfonic acid | Do. |
| 1-hydroxy-6-acetaylaminonaphthalene-3-sulfonic acid | Red. |
| 1-hydroxy - 7 - aminonaphthalene-3-sulfonic acid | Orange-red. |
| 1-hydroxynaphthalene-3,8-disulfonic acid | Do. |
| 1-hydroxynaphthalene-3,6-disulfonic acid | Do. |
| 1-hydroxynaphthalene-4,8-disulfonic acid | Do. |
| 1-hydroxy-8-acetylaminonaphthalene-3,5-disulfonic acid | Red. |

Example 13

A suspension of 10.2 parts of 2-phenyl-4-chloro-6-aminoquinazoline in a mixture of 80 parts of water and 20 parts of concentrated aqueous hydrochloric acid is diazotized with a solution of 2.8 parts of sodium nitrite in 20 parts of water. 120 parts of concentrated acetic acid is then added, and after stirring for 15 minutes the mixture is added to a solution of 11.6 parts of 1-(2-methyl-4-sulfophenyl)-3-methylpyrazolone-(5), 50 parts of sodium acetate and 100 parts of 2 N aqueous sodium hydroxide solution in 400 parts of water. The temperature should not rise to higher than 10° C. The reaction product is separated as described above. The yield is 18 parts. The new dye of the formula

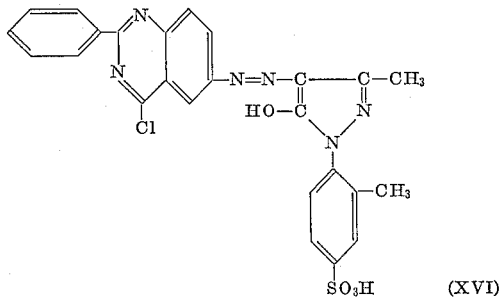

(XVI)

dyes cotton fabric in reddish yellow shades with good fastness properties.

Similar dyes are obtained by using the following coupling components:

| | Shade of dyeing on cellulose |
|---|---|
| 1-(2 - chloro-5-sulfophenyl)-3-methyl-pyrazolone-(5) | Greenish yellow. |
| 1-(3-sulfophenyl) - 3 - methyl-pyrazolone-(5) | Do. |
| 1-(4-sulfophenyl) - 3 - methyl-pyrazolone-(5) | Do. |
| 1 - (2,5 - dichloro - 4 - sulfophenyl)-3-methyl-pyrazolone-(5) | Do. |

Similar dyes are obtained in the same manner by using the following coupling components:

| Coupling component | Shade of dyeing on cotton |
|---|---|
| 1-hydroxynaphthalene-3-sulfonic acid | Red. |
| 2-hydroxynaphthalene-8-sulfonic acid | Red. |
| 2-hydroxynaphthalene-6-sulfonic acid | Red. |
| 1-hydroxy-6-aminonaphthalene-3-sulfonic acid | Red. |
| 1-hydroxy-6-acetylaminonaphthalene-3-sulfonic acid | Red-violet. |
| 1-hydroxy-7-aminonaphthalene-3-sulfonic acid | Red. |
| 1-hydroxynaphthalene-3,8-disulfonic acid | Red. |
| 1-hydroxynaphthalene-3,6-disulfonic acid | Red. |
| 1-hydroxynaphthalene-4,8-disulfonic acid | Red. |
| 1-hydroxy-8-acetylaminonaphthalene-3,5-disulfonic acid | Red-violet. |

The starting material 2-phenyl-4-chloro-6-aminoquinazoline mentioned in paragraph 1 can be obtained in the following manner:

185 parts 2-amino-5-nitrobenzoic amide is dissolved in 1000 parts by volume of N-methyl pyrrolidone at room temperature. 150 parts of benzoyl chloride is added in small portions to this solution. The mixture is stirred for 2 hours at room temperature and then poured into 4000 parts by volume of water. The precipitate is removed by suction, washed with water, and dried.

150 parts of the 2-benzoylamino-5-nitrobenzoic amide thus obtained is stirred in 3000 parts by volume of 1 N aqueous sodium hydroxide solution at 60° C. until the amide is dissolved. This requires as a rule 1½ to 2 hours. The reaction product is then filtered with suction, stirred with water, and strongly acidified with 10% aqueous sulfuric acid. The suspension is stirred for a further 2 hours and then filtered with suction, washed free of acid, and dried.

40 parts of the 2-phenyl-4-hydroxy-6-nitroquinazoline thus obtained is pasted in 150 parts by volume of nitrobenzene. After addition of 20 parts by volume of dimethylformamide, phosgene is introduced into the mixture at 150° C. with efficient stirring. As soon as the conversion is completed, the mixture is allowed to cool and the reaction product is filtered with suction, washed with nitrobenzene and then with methanol, and dried. The 2-phenyl-4-chloro-6-nitroquinazoline thus obtained has a melting point of 200 to 201° C.

100 parts 2-phenyl-4-chloro-6-nitroquinazoline is pasted in 1500 parts by volume of dioxan and after addition of 10 parts Raney nickel, hydrogenated at room temperature. As soon as the hydrogenation is completed, the catalyst is removed by filtering, and the filtrate is poured into 5000 parts by volume of water. The amino compound precipitates. It is filtered with suction, washed with water and dried at 30° C. at reduced pressure. 85 parts 2-phenyl-4-chloro-6-aminoquinazoline in the form of a pale yellow powder is obtained.

*Example 14*

Cotton fabric is padded with an aqueous solution containing 15 parts of the dye

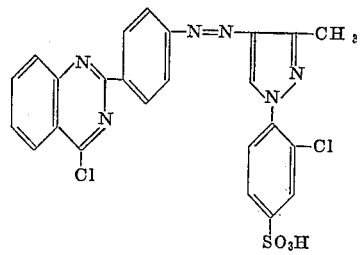

and 10 parts of caustic soda 38° Bé. per 1000 parts, squeezed to retain 100% of moisture, dried and steamed for 5 minutes at 105° C. This is followed by soaping at the boil for 15 minutes in a bath containing 2 parts castile soap and 1 part sodium carbonate per 1000 parts.

A deep reddish yellow dyeing with very good fastness to light and washing is obtained.

*Example 15*

Spun rayon fabric is padded at room temperature with an aqueous solution containing 12 parts of the dye

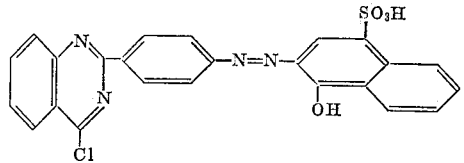

6 parts caustic soda 38° Bé. and 7 parts trisodium phosphate per 1000 parts, squeezed to retain 100% of moisture, rolled in the wet state, and stored for 15 hours at room temperature. This is followed by soaping, as indicated in Example 14.

A brilliant red shade with good fastness to light, washing and rubbing is obtained.

*Example 16*

Cotton fabric is printed with a paste containing 30 parts of the dye

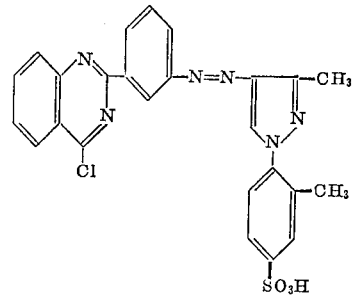

150 parts of urea, 368 parts of water, 400 parts of sodium alginate thickening, 50 parts of potassium carbonate and 2 parts of an aqueous sodium hydroxide solution 38° Bé. per 1000 parts, then dried and steamed for 5 minutes. This is followed by soaping as in Example 14.

A greenish yellow print with very good fastness to light, washing and rubbing is obtained.

We claim:
1. A water-soluble azo dye of the formula:

$$A—N=N—B$$

wherein

A represents the radical of a diazo component selected from the group consisting of 2-(4-aminophenyl)-4-chloroquinazoline, 2-(3-aminophenyl)-4-chloroquinazoline and 2-phenyl-4-chloro-6-aminoquinazoline and B represents a radical selected from the class consisting of the formulae:

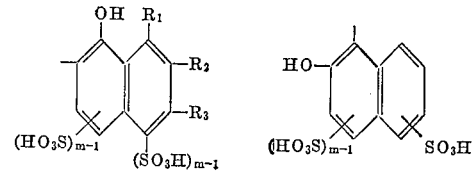

and

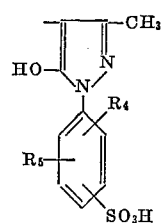

wherein
- $R_1$ represents a member selected from the class consisting of hydrogen, sulfonic acid, hydroxy, amino, acetylamino and benzoylamino,
- $R_2$ represents a member selected from the class consisting of hydrogen and amino,
- $R_3$ represents a member selected from the class consisting of hydrogen, sulfonic acid and acetylamino,
- $R_4$ represents a member selected from the class consisting of hydrogen, chloro and methyl,
- $R_5$ represents a member selected from the class consisting of hydrogen and chloro, and
- $m$ represents an integer of from 1 to 2, said dyestuff containing at least one up to two sulfonic acid substituents as water-solubilizing groups.

2. The dye of the formula:

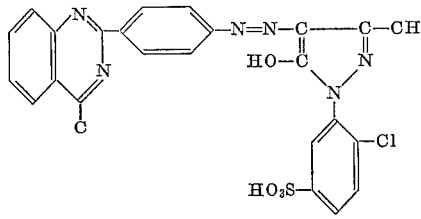

3. The dye of the formula:

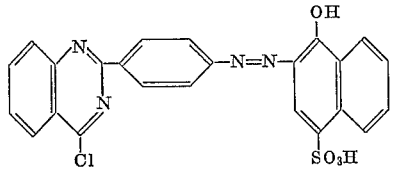

4. The dye of the formula:

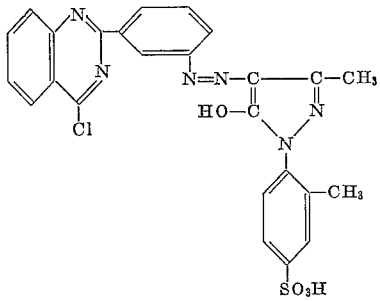

5. The dye of the formula:

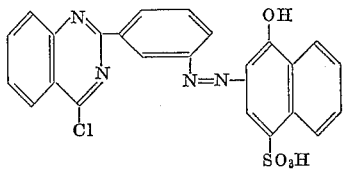

6. The dye of the formula:

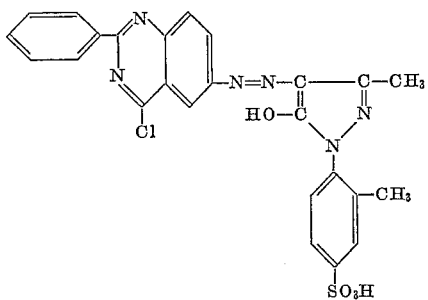

No references cited.

UNITED STATES PATENT OFFICE
CERTIFICATE OF CORRECTION

Patent No. 3,154,532                      October 27, 1964

Hans Weidinger et al.

It is hereby certified that error appears in the above numbered patent requiring correction and that the said Letters Patent should read as corrected below.

Column 10, line 24, for "-6-acetaylaminonaphthalene-" read -- -6-acetylaminonaphthalene- --; column 13, lines 18 to 26, the formula should appear as shown below instead as in the patent:

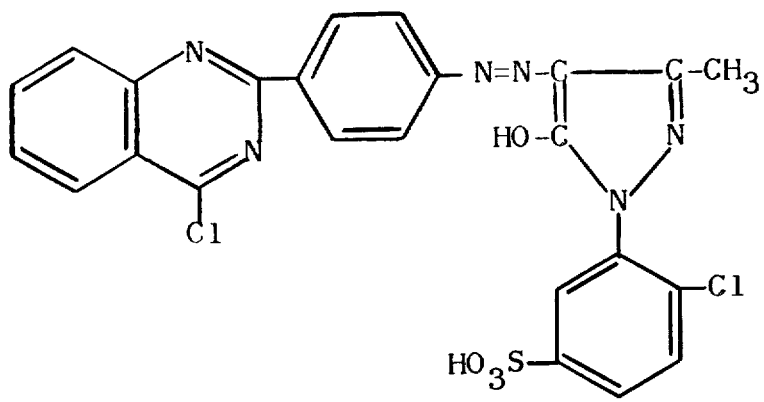

Signed and sealed this 30th day of March 1965.

(SEAL)
Attest:

ERNEST W. SWIDER
Attesting Officer

EDWARD J. BRENNER
Commissioner of Patents